Aug. 23, 1932.　　P. SCHIMMEL ET AL　　1,873,047
VELOCIPEDE
Filed Feb. 2, 1932
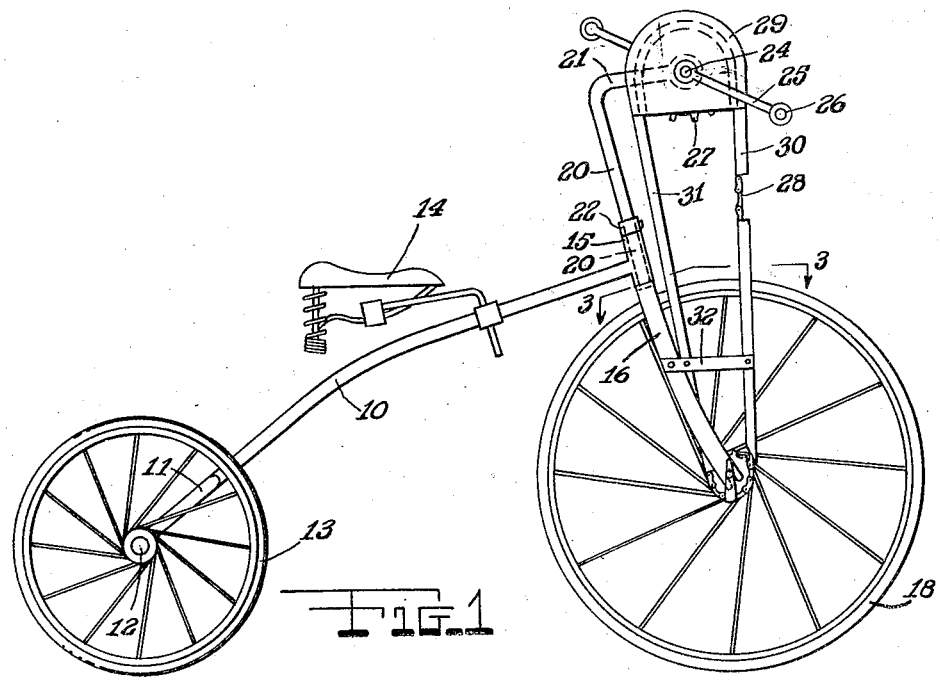
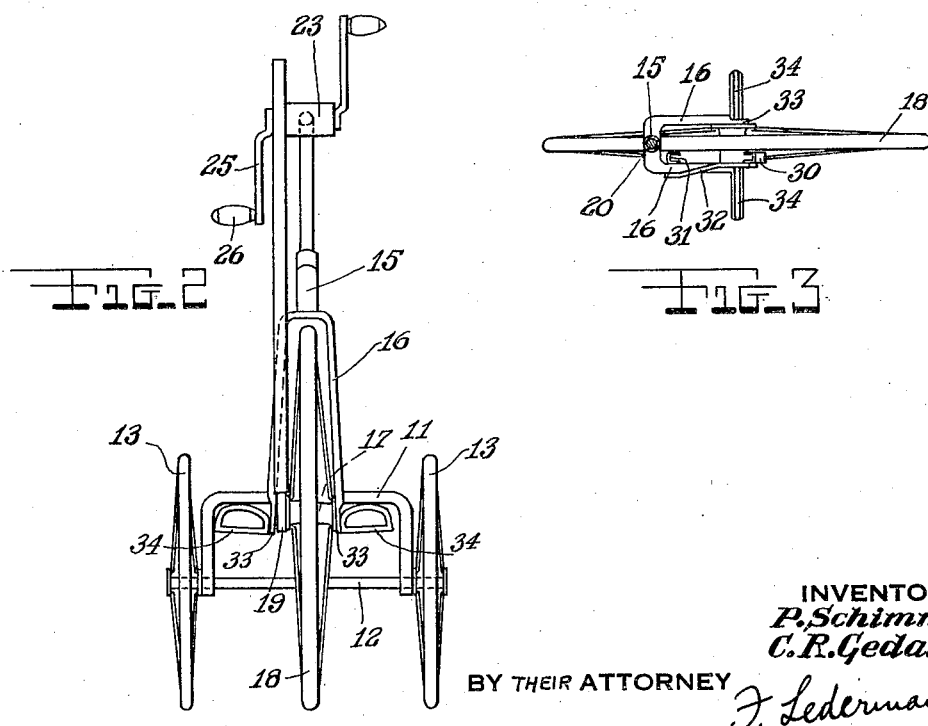
INVENTORS
P. Schimmel
C. R. Gedat
BY THEIR ATTORNEY
F. Ledermann Patented Aug. 23, 1932

1,873,047

UNITED STATES PATENT OFFICE

PAUL SCHIMMEL, OF BLOOMFIELD, NEW JERSEY, AND CURT R. GEDAT, OF NEW YORK, N. Y.

VELOCIPEDE

Application filed February 2, 1932. Serial No. 590,376.

The main object of this invention is the provision of a novel velocipede having a hand-operated crank propulsion means, and rigid stirrups fixed to the fork which supports the front wheel, the stirrups providing supports for the feet and at the same time means whereby the vehicle may be steered by the feet.

Another object of the invention is to provide a velocipede having a propelling crank located in front of the rider for propelling the vehicle by hand, and a chain connected to the driving wheel by means of a pinion on the latter, a housing or guard covering both the chain and the toothed wheels or gears.

Still another object of the invention is the provision of a velocipede such as mentioned, the foot saddles being tilted toward the center of the front wheel, so that the feet normally tend toward this center, whereby a minimum amount of effort is required of the feet for steering the vehicle.

The above and other objects will become apparent in the description below, in which characters of reference refer to like-named parts in the drawing.

Referring briefly to the drawing, Figure 1 is a side elevational view of the velocipede.

Figure 2 is a front elevational view of the same.

Figure 3 is a cross-sectional view taken on the line 3—3 of Figure 1.

Referring in detail to the drawing, the numeral 10 represents the main bar of the vehicle frame. This frame is forked at its rear, and the arms 11 of the fork rotatably support an axle 12, on the ends of which are mounted the rear wheels 13. Or the axle 12 may be rigid in the fork 11, and the wheels 13 rotatably mounted on the axle. The usual adjustable seat is shown at 14.

At the forward end of the bar 10, at substantially right-angles thereto, a rigid hollow column 15 is formed. A fork 16 extends from the lower end of this column, and is slightly curved throughout its length, as shown. At the lower end of the fork 16, a front axle 17, on which is mounted the front wheel 18, is supported. On one side of the wheel 18, and rigid therewith, a pinion 19 is mounted.

A post 20, rigid with and extending upward from the fork 16, passes rotatably through the column 15, and at its upper end extends forward, as shown at 21. An adjustable sleeve 22, slidable along the post 20, provides means for restricting the upward movement or play of the column 15 along the post 20. The usual standard arrangement whereby the fork 16 and post 20 may be removed from the column 15, may be provided but is not shown, as it forms no part of this invention.

At the forward end of the arm 21 of the post 20, a bearing housing 23 is provided, through which the rotatable shaft 24 of the crank 25 passes. The ends of the arms of the crank 25 are provided with loosely mounted, rotatable handles 26. On the same side of the front wheel as the pinion 19, a sprocket wheel 27 is rigidly mounted on the shaft 24. A sprocket chain 28 is looped about the wheel 27 and the pinion 19. A housing 29 is rigidly mounted on the housing 23 and serves as a protective guard for the sprocket wheel 27. A tube-like guard 30, attached at its upper end to the housing 20 and extending to the pinion 19, serves to guard the clothing of the rider from the chain 28; a similar guard 31 is provided for the other side of the chain. A bracket 32 is rigidly attached to the fork 16, and the guards 30 and 31 are secured thereto, whereby the latter are supported in fixed position.

The lower ends of the fork 16 are narrowed into fingers 33 at the ends of the front wheel shaft 17, and rigidly attached to these fingers by their sides are foot stirrups 34 formed in the manner of a complete loop so that the feet are prevented from slipping out of the stirrups in an upward direction. These stirrups are inclined toward the center of the wheel 18, as shown, so that the feet normally tend to slide toward the center of this wheel.

In operation, rotation of the crank 25 by hand obviously causes rotation of the pinion 19 and propulsion of the vehicle. Steering is accomplished by the feet resting in stirrups 34, the inclination of the saddles normally urging the feet toward the center of the wheel 16 where they are most efficiently adapted for steering the wheel. By providing this steering means, the function of the hands and arms of the rider is limited to that of propelling the vehicle, and the feet are limited to steering.

Obviously, modifications in the form and structure may be made without departing from the spirit of the invention.

We claim:

In a velocipede, a main frame having a hollow column at its forward end, a post rotatable in said column and having a fork extending therefrom beneath said column, a crank shaft rotatably mounted in the upper end of said post, arms attached to said crank shaft for rotating the same, a sprocket wheel rigid with said shaft, a wheel rotatably mounted between the ends of said fork, a pinion rigid with said wheel, a chain looped over said sprocket and said pinion, a guard rigid with said post and fork enclosing said sprocket and chain, and foot stirrups rigid with said fork.

In testimony whereof we affix our signatures.

PAUL SCHIMMEL.
CURT R. GEDAT.